(12) United States Patent
Georgeson et al.

(10) Patent No.: US 11,554,544 B2
(45) Date of Patent: Jan. 17, 2023

(54) ADDITIVE MANUFACTURING SYSTEM WITH X-RAY BACKSCATTER IMAGING SYSTEM AND METHOD OF INSPECTING A STRUCTURE DURING ADDITIVE MANUFACTURING OF THE STRUCTURE

(71) Applicant: The Boeing Company, Chicago, IL (US)

(72) Inventors: Gary E. Georgeson, Tacoma, WA (US); Morteza Safai, Newcastle, WA (US)

(73) Assignee: The Boeing Company, Chicago, IL (US)

( * ) Notice: Subject to any disclaimer, the term of this patent is extended or adjusted under 35 U.S.C. 154(b) by 670 days.

(21) Appl. No.: 16/578,254

(22) Filed: Sep. 20, 2019

(65) Prior Publication Data

US 2021/0086441 A1  Mar. 25, 2021

(51) Int. Cl.

| | | |
|---|---|---|
| *G01N 23/203* | (2006.01) | |
| *B29C 64/188* | (2017.01) | |
| *B29C 64/20* | (2017.01) | |
| *G06T 7/00* | (2017.01) | |
| *G06T 7/13* | (2017.01) | |
| *G01N 23/20008* | (2018.01) | |
| *B33Y 30/00* | (2015.01) | |
| *B33Y 10/00* | (2015.01) | |

(52) U.S. Cl.
CPC ............ *B29C 64/188* (2017.08); *B29C 64/20* (2017.08); *G01N 23/203* (2013.01); *G01N 23/20008* (2013.01); *G06T 7/0004* (2013.01); *G06T 7/13* (2017.01); *B33Y 10/00* (2014.12); *B33Y 30/00* (2014.12); *G01N 2223/053* (2013.01); *G01N 2223/1016* (2013.01); *G01N 2223/3301* (2013.01)

(58) Field of Classification Search
None
See application file for complete search history.

(56) References Cited

U.S. PATENT DOCUMENTS

| 8,094,781 | B1 | 1/2012 | Safai et al. | |
|---|---|---|---|---|
| 8,761,338 | B2 | 6/2014 | Safai | |
| 9,151,721 | B2 | 10/2015 | Safai | |
| 9,658,173 | B2 | 5/2017 | Georgeson et al. | |
| 9,739,727 | B2 | 8/2017 | Safai et al. | |
| 2007/0269014 | A1* | 11/2007 | Safai | H01J 35/10 378/143 |
| 2010/0140470 | A1* | 6/2010 | Shachal | H01J 37/301 277/648 |
| 2018/0126670 | A1* | 5/2018 | DehghanNiri | B22F 10/20 |
| 2018/0328869 | A1 | 11/2018 | Safai et al. | |
| 2019/0357863 | A1* | 11/2019 | Dirisio | A61B 6/4405 |

* cited by examiner

*Primary Examiner* — Hoon K Song
(74) *Attorney, Agent, or Firm* — Yee & Associates, P.C.

(57) ABSTRACT

A method of inspecting a structure during additive manufacturing of the structure and additive manufacturing systems are presented. An additive manufacturing system comprises additive manufacturing equipment comprising a casing and an additive manufacturing head configured to form a plurality of layers of a structure within the casing; and an x-ray backscatter imaging system configured to send an x-ray beam into a structure formed within the additive manufacturing equipment and detect scattered x-rays for imaging and analysis of the structure during fabrication.

20 Claims, 11 Drawing Sheets

ADDITIVE MANUFACTURING SYSTEM WITH X-RAY BACKSCATTER IMAGING SYSTEM AND METHOD OF INSPECTING A STRUCTURE DURING ADDITIVE MANUFACTURING OF THE STRUCTURE

BACKGROUND INFORMATION

1. Field

The present disclosure relates generally to additive manufacturing of structures and more specifically to systems and a method for inspecting a structure formed within an additive manufacturing system during manufacturing.

2. Background

Additive manufacturing is becoming more prevalent in several industries, including aerospace applications. Additive manufacturing has several advantages including providing manufacturing of practically any desired shape. Inspection of a manufactured structure is desired to confirm quality of the structure. However, inspection of structures formed by additive manufacturing is at least one of more difficult or more expensive than desired.

Therefore, it would be desirable to have a method and apparatus that takes into account at least some of the issues discussed above, as well as other possible issues.

SUMMARY

An embodiment of the present disclosure provides an additive manufacturing system. The additive manufacturing system comprises additive manufacturing equipment and an x-ray backscatter imaging system. The additive manufacturing equipment comprises a casing and an additive manufacturing head configured to form a plurality of layers of a structure within the casing. The x-ray backscatter imaging system is configured to send an x-ray beam into a structure formed within the additive manufacturing equipment and detect scattered X-rays for imaging and analysis of the structure during fabrication.

Another embodiment of the present disclosure provides an additive manufacturing system. The additive manufacturing system comprises additive manufacturing equipment, an x-ray backscatter imaging system, and a processor. The x-ray backscatter imaging system is configured to inspect a structure formed within the additive manufacturing equipment, the x-ray backscatter imaging system comprising an x-ray source, a rotating collimator, and a number of x-ray detectors. The processor is configured to isolate data for a number of nearest most layers by removing prior layer artifacts from scan data generated by the x-ray backscatter imaging system.

Yet another embodiment of the present disclosure provides a method of inspecting a structure during additive manufacturing of the structure. A layer of a plurality of layers of the structure is formed using an additive manufacturing head of additive manufacturing equipment. An x-ray beam is sent into the layer using a scanner of an x-ray backscatter imaging system while the layer is in the additive manufacturing equipment and prior to depositing any subsequent layers. Backscatter from the x-ray beam encountering the structure is detected to form scan data. Prior layer artifacts are removed from the scan data to form data for a number of nearest layers including the layer.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. The illustrative embodiments recognize and take into account that additive manufacturing (AM) methods are being developed for aerospace applications, as well as for other industries. The illustrative embodiments also recognize and take into account that validation of an as-manufactured structure is important for many applications, but current non-destructive evaluation methods are either too costly or are poorly suited to the texture or complexity (geometric or internal) of the additively manufactured structure.

The illustrative examples recognize and take into account that in-situ Infrared thermography has depth limitations. The illustrative examples recognize and take into account that couplant for in-situ ultrasound may undesirably interfere with the additive manufacturing (AM) process. The illustrative examples recognize and take into account that laser ultrasound may be undesirably costly or undesirably slow. The illustrative examples recognize and take into account that through-transmission x-ray methods become less sensitive to additive manufacturing (AM) inconsistencies as part thickness increases.

The illustrative embodiments provide an in-situ method for verifying the quality of an additive manufactured (AM) structure as the structure is being fabricated. The illustrative embodiments provide an in-process or in-situ method for inspecting additive manufactured (AM) structure with at least one of a lower cost or better resolution than current non-destructive inspection (NDE) methods.

Figure 1:
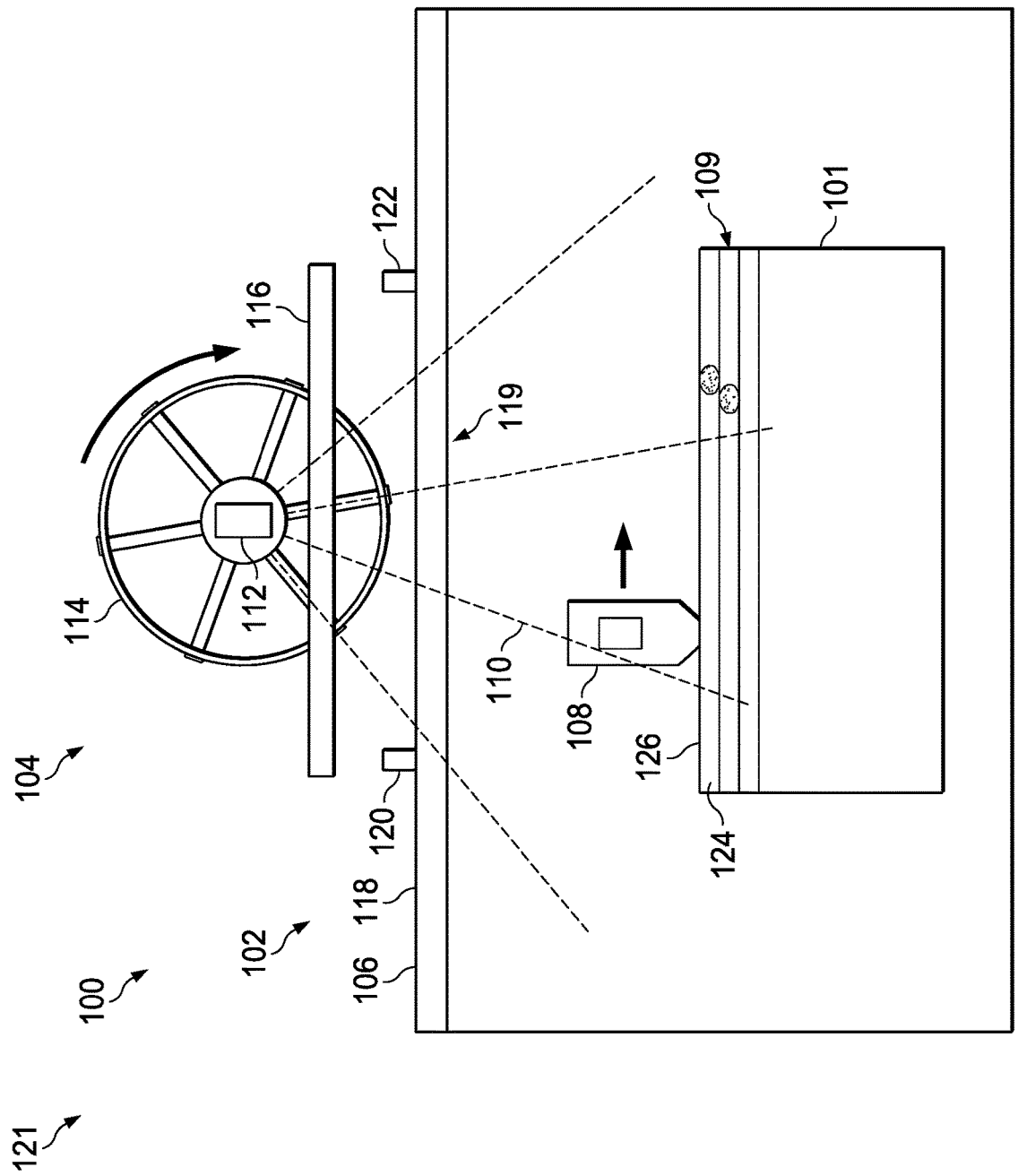
FIG. 1 is an illustration of a front view of an additive manufacturing system with an x-ray backscatter imaging system on top of a casing of the additive manufacturing system in accordance with an illustrative embodiment.

Turning now to FIG. 1, an illustration of a front view of an additive manufacturing system with an x-ray backscatter imaging system on top of a casing of the additive manufacturing system is depicted in accordance with an illustrative embodiment. Additive manufacturing system 100 is configured to form a structure, such as structure 101. Additive manufacturing system 100 comprises additive manufacturing equipment 102 and x-ray backscatter imaging system 104. Additive manufacturing equipment 102 comprises casing 106 and additive manufacturing head 108 configured to form a plurality of layers of a structure, such as plurality of layers 109 of structure 101, within casing 106. X-ray backscatter imaging system 104 is configured to send x-ray beam 110 into structure 101 formed within additive manufacturing equipment 102 and detect scattered x-rays for imaging and analysis of structure 101 during fabrication. X-ray backscatter imaging system 104 performs imaging and analysis during fabrication of structure 101 by performing imaging and analysis of a layer as the layer is formed by additive manufacturing head 108 or following formation of the layer by additive manufacturing head 108. As depicted, x-ray backscatter imaging system 104 is coupled to casing 106.

X-ray backscatter imaging system 104 comprises x-ray source 112, rotating collimator 114, and number of x-ray detectors 116. As depicted, x-ray backscatter imaging system 104 is positioned outside of additive manufacturing equipment 102. Thus, x-ray beam 110 is sent through casing 106 and into structure 101. As depicted, x-ray beam 110 is sent into top 118 of casing 106.

In this illustrative example, x-ray backscatter imaging system 104 is positioned outside of casing 106, and casing 106 of additive manufacturing equipment 102 includes a portion 119 formed of an x-ray transmissive material.

As depicted, x-ray backscatter imaging system 104 comprises movement system 120 mounted on casing 106 of additive manufacturing equipment 102 and configured to move x-ray backscatter imaging system 104 relative to casing 106. In view 121, movement system 120 includes rails 122 mounted on casing 106. X-ray backscatter imaging system 104 is mounted on casing 106 of additive manufacturing equipment 102 such that x-ray beam 110 sent by x-ray backscatter imaging system 104 encounters the most recently formed layer, layer 124, of structure 101 first. As depicted, x-ray backscatter imaging system 104 sends x-ray beam 110 into upper surface 126 of layer 124.

Additive manufacturing head 108 is moved over structure 101 on an x-y scan bridge or robotic arm (not depicted) to place material, as x-ray backscatter imaging system 104 scans behind it, scans on the side where material has already been added, or waits to scan after one or more layers are added.

X-ray backscatter imaging system 104 and additive manufacturing head 108 could be scanning together, with a scanner head of x-ray backscatter imaging system 104 trailing additive manufacturing head 108 to look for inconsistencies as additive manufacturing head 108 puts down product. Alternatively, x-ray backscatter imaging system 104 and additive manufacturing head 108 could each act independently, waiting between adding one or more layers and inspecting. The inspection time advantage of a multi-layer inspection could be traded against no down time with the additive manufacturing process during inspection, but a possibly slower additive manufacturing process in order to get higher detection sensitivity from x-ray backscatter imaging system 104.

Figure 2:
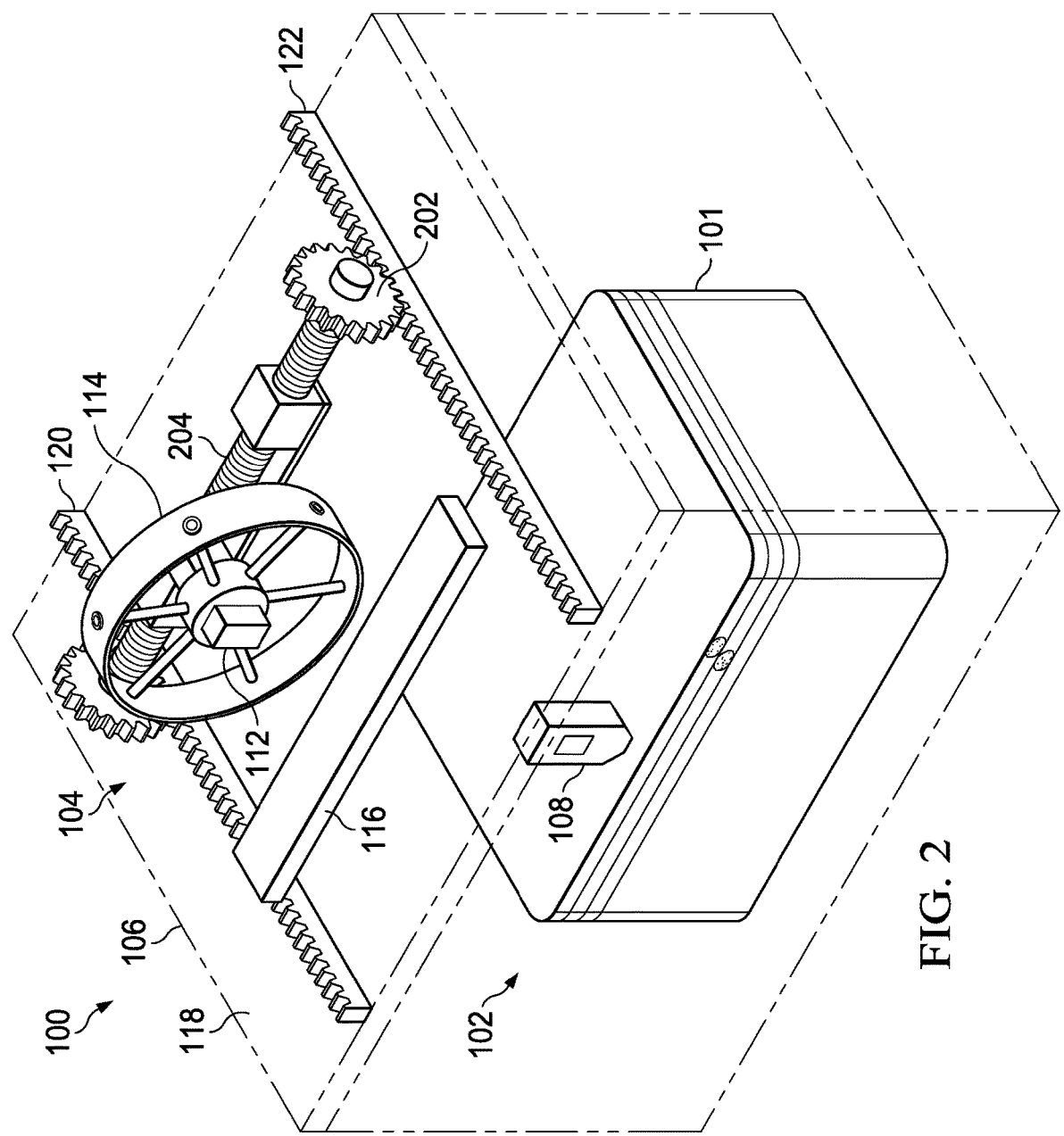
FIG. 2 is an illustration of a perspective view of an additive manufacturing system in accordance with an illustrative embodiment.

Turning now to FIG. 2, an illustration of a perspective view of an additive manufacturing system is depicted in accordance with an illustrative embodiment. View 200 is a perspective view of additive manufacturing system 100 of FIG. 1. In view 200, movement system 120 of x-ray backscatter imaging system 104 is visible. As can be seen, movement system 120 comprises X-translators 202 and Y-translators 204.

Figure 3:
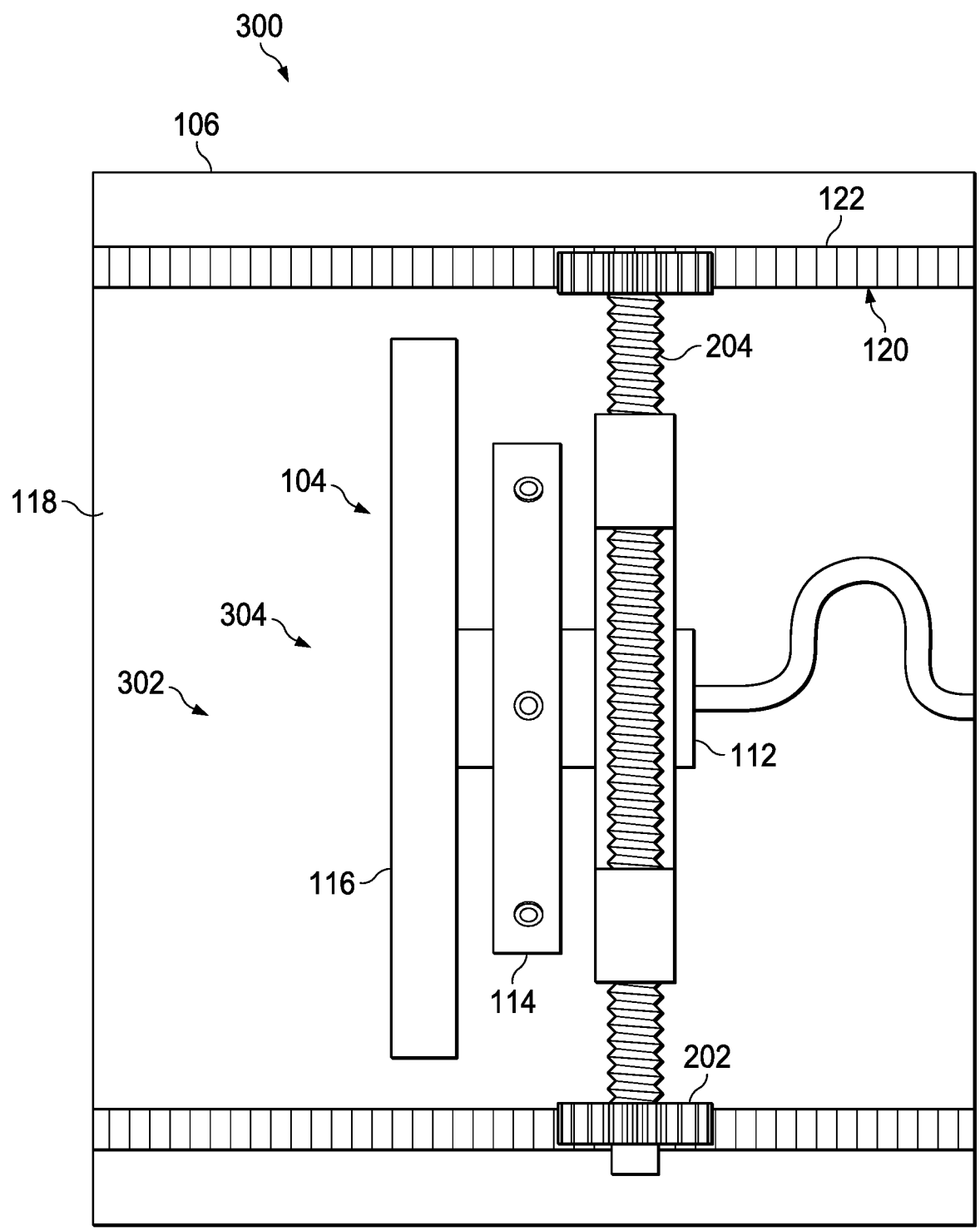
FIG. 3 is an illustration of a top view of an additive manufacturing system in accordance with an illustrative embodiment.

Turning now to FIG. 3, an illustration of a top view of an additive manufacturing system is depicted in accordance with an illustrative embodiment. View 300 is a top view of additive manufacturing system 100 of FIG. 1. In view 300, top 302 of casing 106 is opaque. Although top 302 of casing 106 is visually opaque, x-ray beams can be sent through casing 106 and into a structure within casing 106. Casing 106 is formed of x-ray transmissive material 304. The x-ray transmissive material 304 is x-ray transmissive due to at least the smooth surface of casing 106.

X-translators 202 and Y-translators 204 of movement system 120 are visible in view 300. In some illustrative examples, one of x-translators 202 or y-translators 204 are optional depending upon the size of structure 101 formed in casing 106. In some illustrative examples, y-axis translation may be used only for larger parts. For example, y-axis translation may only be present when a single pass of x-ray backscatter imaging system 104 is not enough to cover the entire area of structure 101 of FIG. 1.

Figure 4:
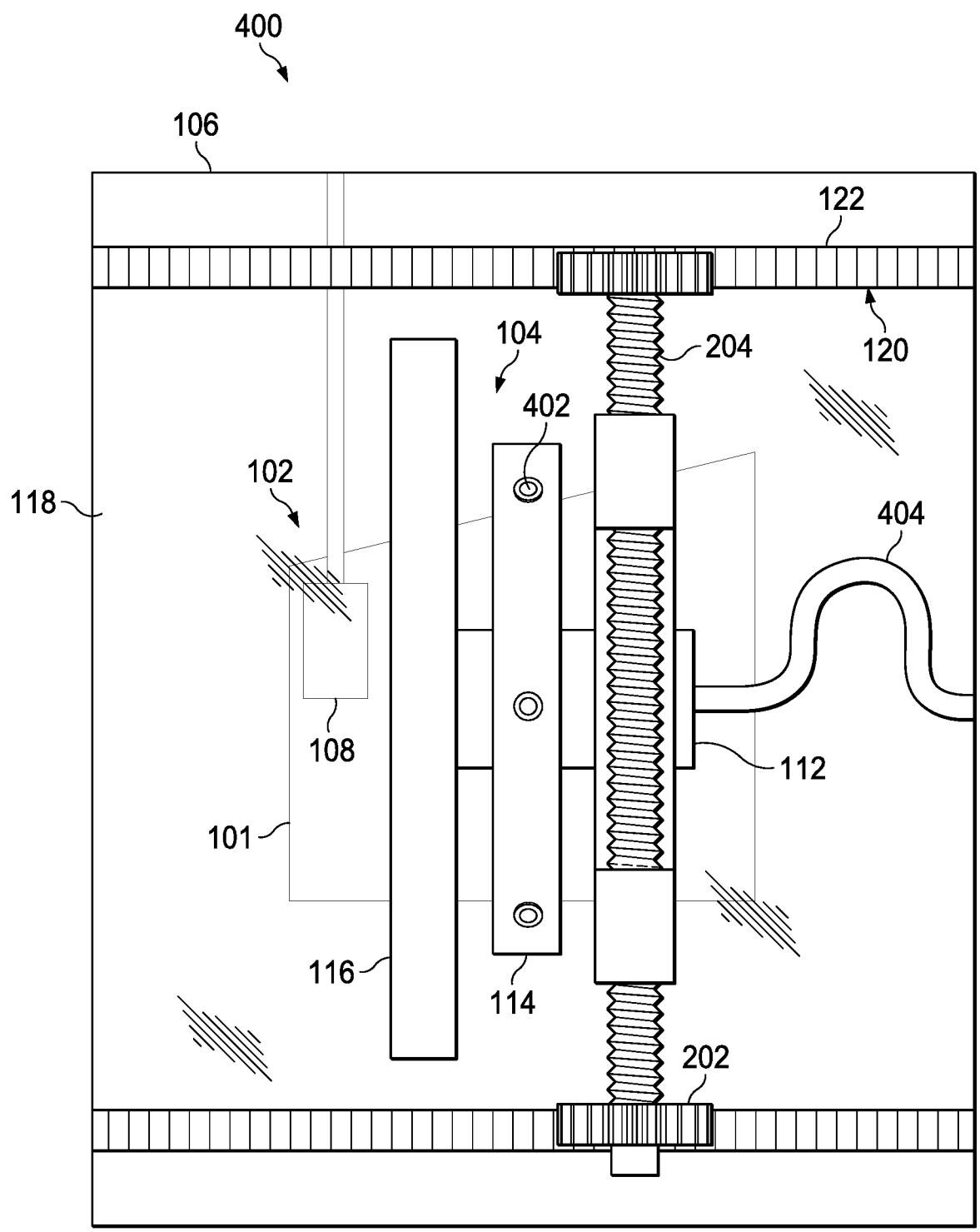
FIG. 4 is an illustration of a top view of an additive manufacturing system with a transparent casing in accordance with an illustrative embodiment.

Turning now to FIG. 4, an illustration of a top view of an additive manufacturing system with a transparent casing is depicted in accordance with an illustrative embodiment. View 400 is a top view of additive manufacturing system 100 of FIG. 1 with top 302 of casing 106 shown as transparent.

In view 400, a view looking down through the top of casing 106 is provided. X-ray backscatter imaging system 104 is scanning from right to left as it moves along rails 122 and collimator 114 rotates. Apertures 402 of collimator 114 are visible.

In some illustrative examples, x-ray backscatter imaging system 104 follows behind additive manufacturing head 108. In some illustrative examples, additive manufacturing head 108 adds lines of material from right to left.

In some illustrative examples, encoders (not depicted) on at least one of x-translators 202, y-translators 204, or rails 122 provide the positional information of x-ray backscatter imaging system 104. During operation, the scatter counts at x-ray detectors 116 of FIG. 1 are correlated to the position, and enable a two-dimensional image to be created.

In some illustrative examples, x-ray backscatter imaging system 104 has an integrated high voltage power supply. In some illustrative examples, a high voltage power supply has at least 90,000 volts. In some illustrative examples, a high voltage power supply has between 90,000 and 160,000 volts. As depicted, x-ray backscatter imaging system 104 has high voltage cable 404.

Figure 5:
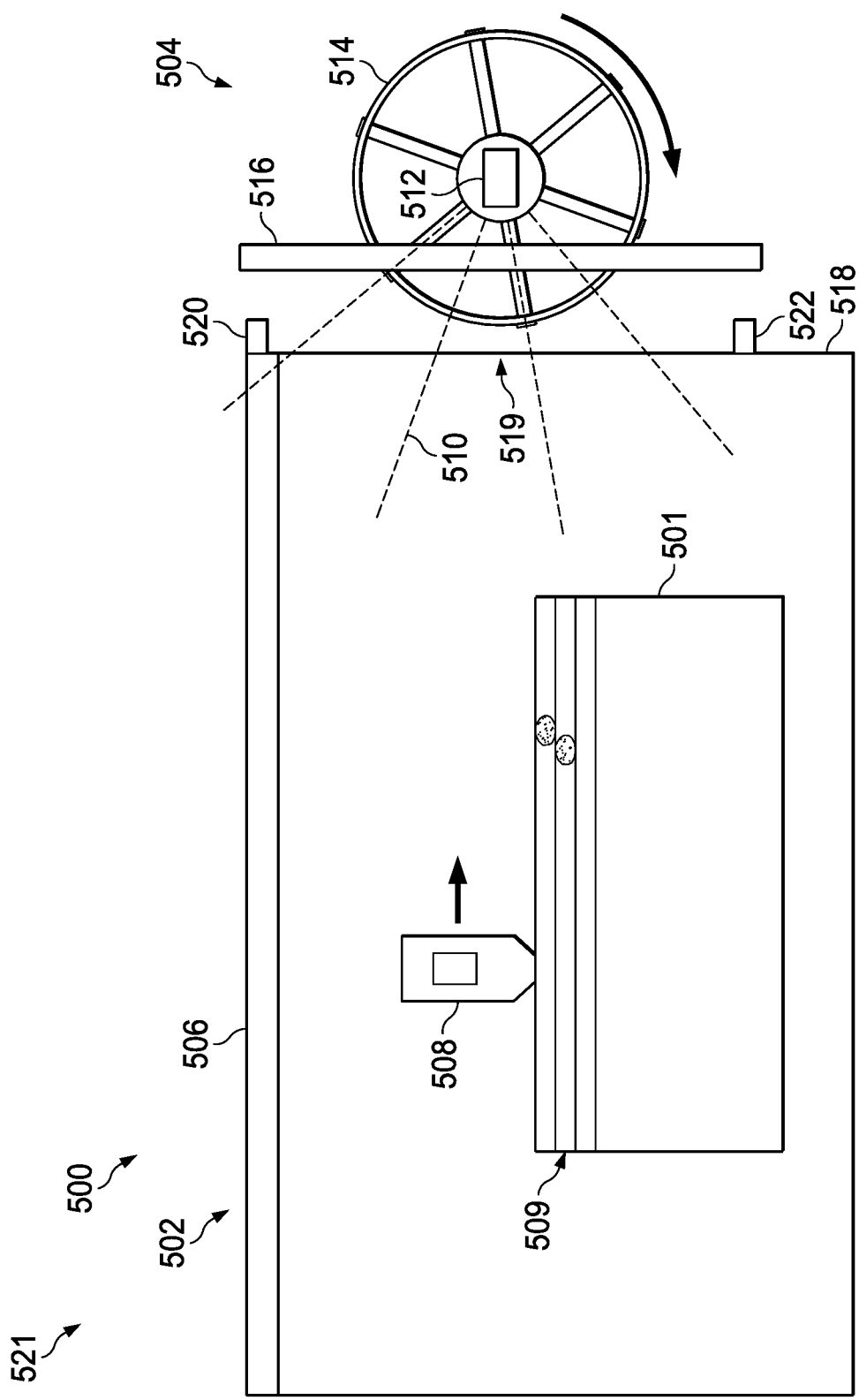
FIG. 5 is an illustration of a front view of an additive manufacturing system with an x-ray backscatter imaging system on the side of a casing of the additive manufacturing system in accordance with an illustrative embodiment.

Turning now to FIG. 5, an illustration of a front view of an additive manufacturing system with an x-ray backscatter imaging system on the side of a casing of the additive manufacturing system is depicted in accordance with an illustrative embodiment. Additive manufacturing system 500 is configured to form a structure, such as structure 501. Additive manufacturing system 500 comprises additive manufacturing equipment 502 and x-ray backscatter imaging system 504. Additive manufacturing equipment 502 comprises casing 506 and additive manufacturing head 508 configured to form a plurality of layers of a structure, such as plurality of layers 509 of structure 501, within casing 506. X-ray backscatter imaging system 504 is configured to send x-ray beam 510 into structure 501 formed within additive manufacturing equipment 502 and detect scattered x-rays for imaging and analysis of structure 501 during fabrication. X-ray backscatter imaging system 504 performs imaging and analysis during fabrication of structure 501 by performing imaging and analysis of a layer as the layer is formed by additive manufacturing head 508 or following formation of the layer by additive manufacturing head 508. As depicted, x-ray backscatter imaging system 504 is coupled to casing 506. As depicted, x-ray backscatter imaging system 504 is coupled to a side of casing 506. As depicted, x-ray backscatter imaging system 504 is coupled to the side of casing 506 such that x-ray backscatter imaging system 504 moves perpendicular to the nearest most layer of structure 501.

X-ray backscatter imaging system 504 comprises x-ray source 512, rotating collimator 514, and number of x-ray detectors 516. As depicted, x-ray backscatter imaging system 504 is positioned outside of additive manufacturing equipment 502. Thus, x-ray beam 510 is sent through casing 506 and into structure 501. As depicted, x-ray beam 510 is sent into side 518 of casing 506. In this illustrative example, x-ray backscatter imaging system 504 is positioned outside of casing 506, and casing 506 of additive manufacturing equipment 502 includes portion 519 formed of an x-ray transmissive material.

As depicted, x-ray backscatter imaging system 504 comprises movement system 520 mounted on casing 506 of additive manufacturing equipment 502 and configured to move x-ray backscatter imaging system 504 relative to casing 506. In view 521, movement system 520 includes rails 522 mounted on casing 506. X-ray backscatter imaging system 504 is mounted on casing 506 of additive manufacturing equipment 502 such that x-ray beam 510 sent by x-ray backscatter imaging system 504 encounters the side of structure 501.

Additive manufacturing head 508 is moved over structure 501 on an x-y scan bridge or robotic arm (not depicted) to place material, as x-ray backscatter imaging system 504 scans behind it, scans on the side where material has already been added, or waits to scan after one or more layers are added.

X-ray backscatter imaging system 504 and additive manufacturing head 508 could each act independently, waiting between adding one or more layers and inspecting. In other illustrative examples, x-ray backscatter imaging system 504 moves as additive manufacturing head 508 deposits material in structure 501.

Figure 6:
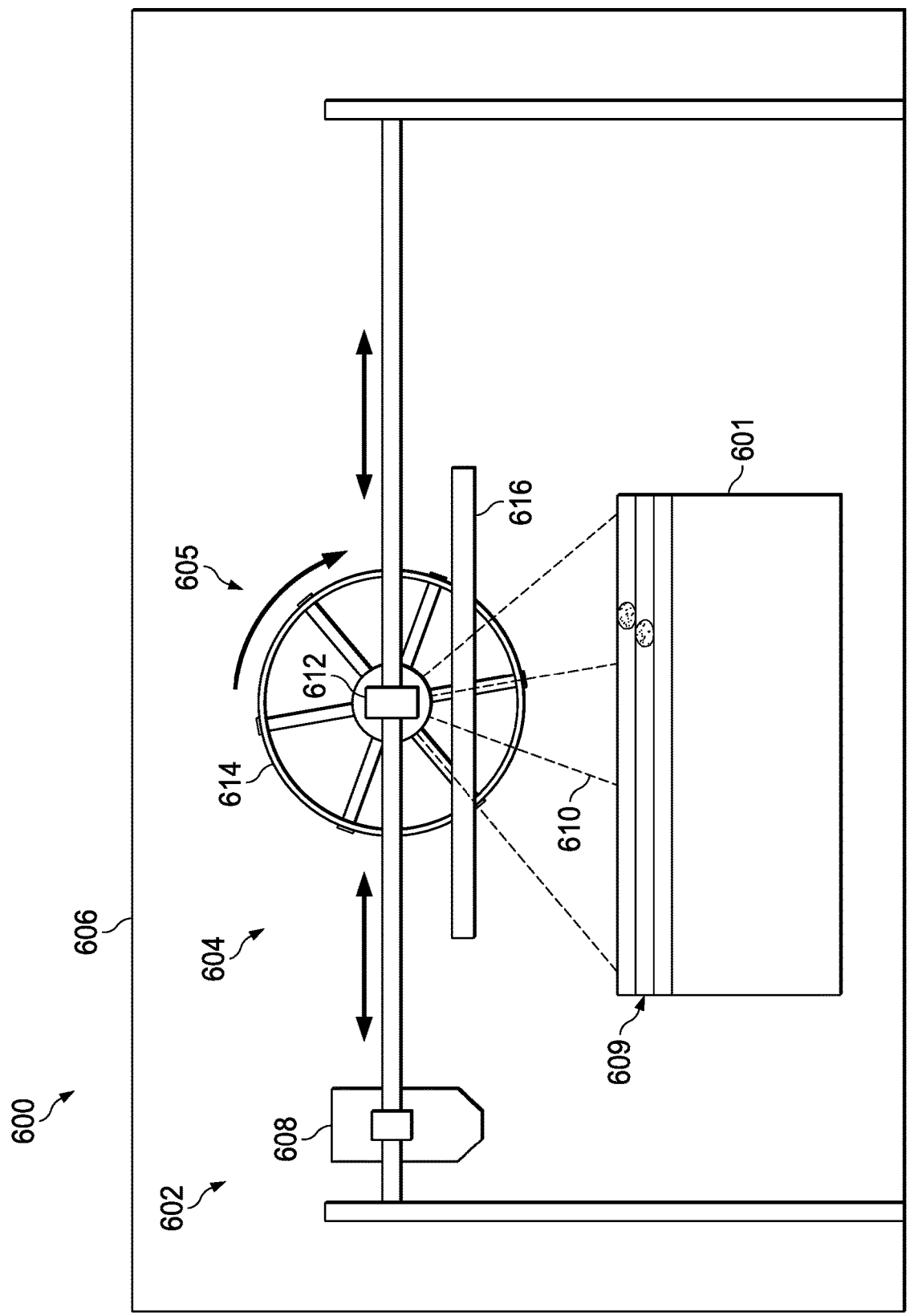
FIG. 6 is an illustration of a front view of an additive manufacturing system with an x-ray backscatter imaging system inside a casing of the additive manufacturing system in accordance with an illustrative embodiment.

Turning now to FIG. 6, an illustration of a front view of an additive manufacturing system with an x-ray backscatter imaging system inside a casing of the additive manufacturing system is depicted in accordance with an illustrative embodiment. In additive manufacturing system 600, scanner 605 of x-ray backscatter imaging system 604 is within casing 606 of additive manufacturing equipment 602.

Additive manufacturing system 600 is configured to form a structure, such as structure 601. Additive manufacturing system 600 comprises additive manufacturing equipment 602 and x-ray backscatter imaging system 604. Additive manufacturing equipment 602 comprises casing 606 and additive manufacturing head 608 configured to form a plurality of layers of a structure, such as structure 601, within casing 606. X-ray backscatter imaging system 604 is configured to send x-ray beam 610 into structure 601 formed within additive manufacturing equipment 602 and detect scattered x-rays for imaging and analysis of structure 601 during fabrication. X-ray backscatter imaging system 604 performs imaging and analysis during fabrication of structure 601 by performing imaging and analysis of a layer as the layer is formed by additive manufacturing head 608 or following formation of the layer by additive manufacturing head 608.

Scanner 605 of x-ray backscatter imaging system 604 is associated with a same movement system as the additive manufacturing head 608. As depicted, x-ray backscatter imaging system 604 is coupled to rails 611 of additive manufacturing equipment 602. Additive manufacturing head 608 moves along rails 611 to deposit material to form plurality of layers 609 of structure 601. Rails 611 may also be referred to as an x-y scan bridge. X-ray backscatter imaging system 604 moves along rails 611 to inspect structure 601.

X-ray backscatter imaging system 604 comprises x-ray source 612, rotating collimator 614, and number of x-ray detectors 616. Scanner 605 includes x-ray source 612, rotating collimator 614, and number of x-ray detectors 616. As depicted, x-ray backscatter imaging system 604 is positioned within additive manufacturing equipment 602. Thus, x-ray beam 610 does not travel through casing 606. X-ray beam 610 goes directly into structure 601.

In some illustrative examples, additive manufacturing head 608 is moved over structure 601 on rails 611 to place material, as x-ray backscatter imaging system 604 scans behind it, scans on the side where material has already been added, or waits to scan after one or more layers are added. X-ray backscatter imaging system 604 and additive manufacturing head 608 could each act independently, waiting between adding one or more layers and inspecting. In other illustrative examples, x-ray backscatter imaging system 604 moves as additive manufacturing head 608 deposits material in structure 601.

Figure 7:
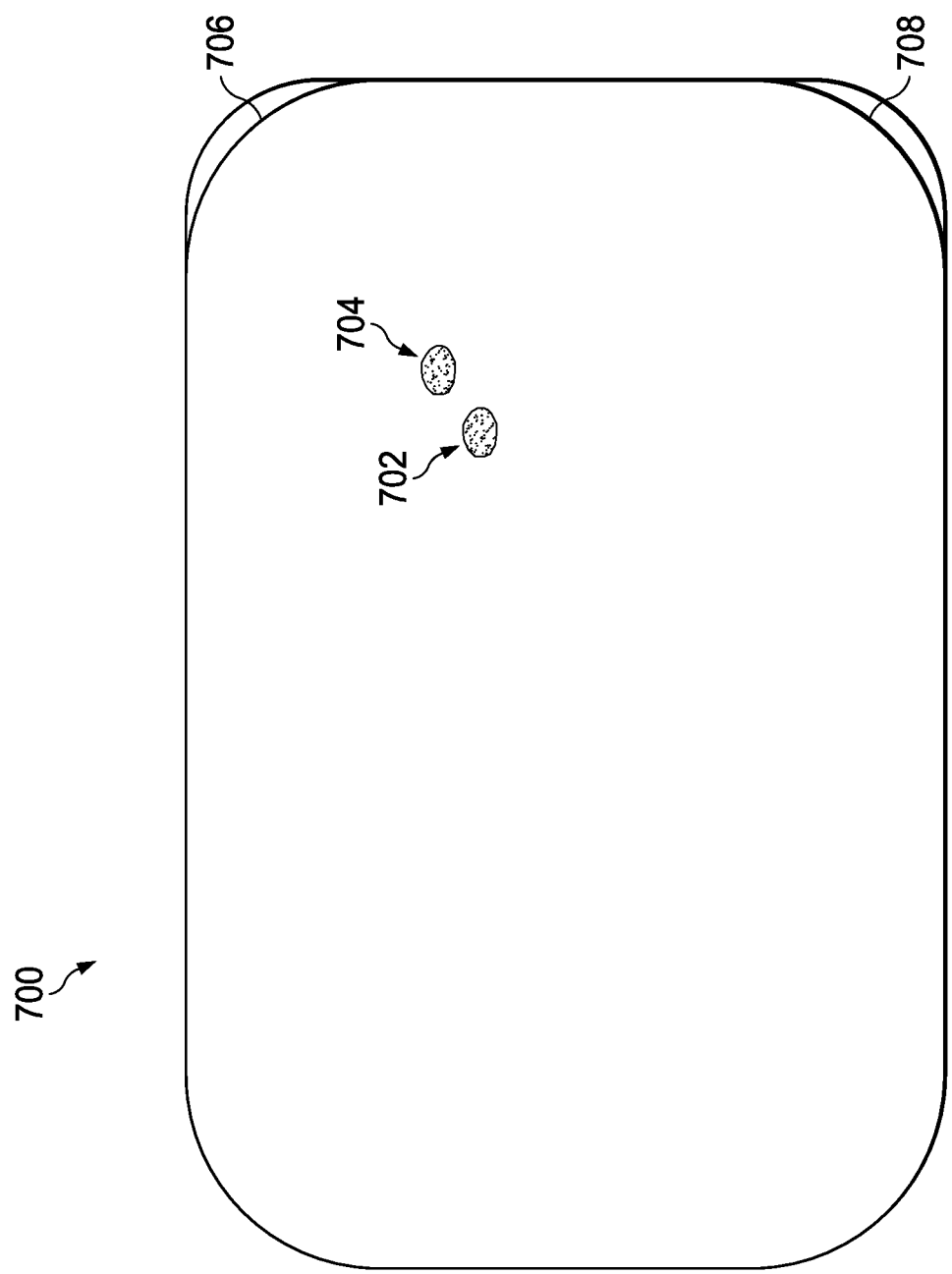
FIG. 7 is an illustration of an x-ray backscatter image of a structure in an additive manufacturing system in accordance with an illustrative embodiment.

Turning now to FIG. 7, an illustration of an x-ray backscatter image of a structure in an additive manufacturing system is depicted in accordance with an illustrative embodiment. Image 700 is an image that may be generated by additive manufacturing system 100 of FIGS. 1-4. Image 700 is an image that may be generated by additive manufacturing system 500 of FIG. 5. Image 700 is an image that may be generated by additive manufacturing system 600 of FIG. 6.

Image 700 is a two-dimensional backscatter image of recently applied layers of a structure. In some examples, image 700 is referred to as an x-ray backscatter image. Image 700 is created from data formed by x-ray backscatter received at a detector of an x-ray backscatter imaging system. Image 700 is created from data formed by x-ray backscatter received from a structure. Image 700 is analyzed for out-of-tolerance inconsistencies such as voids, dimensional differences, warping, edges, and other macro inconsistencies. The two-dimensional data sets gathered from an x-ray backscatter imaging system can be automatically compared "on the fly" against the data from a set of identical layers from a reference part having a desired quality.

Image 700 is representative of a structure, such as structure 101 of FIG. 1, structure 501 of FIG. 5, or structure 601 of FIG. 6. In some illustrative examples, image 700 is compared to an image of a reference part to identify locations of inconsistencies in the structure. Locations of inconsistencies in image 700 correspond to inconsistencies in the structure. In image 700, inconsistency 702, inconsistency 704, inconsistency 706, and inconsistency 708 are identified.

Information within image 700 can be used to classify a type of inconsistency for each location in the structure. For example, using information within image 700, inconsistency 702 and inconsistency 704 may be classified as voids. As another example, using information within image 700, inconsistency 706 and inconsistency 708 may be classified as out-of-tolerance geometry and warping.

Information within image 700 can be used to determine whether rework to the structure is desired. Information within image 700 can be used to determine whether system adjustments are desired to reduce inconsistencies in future structures.

Figure 8:
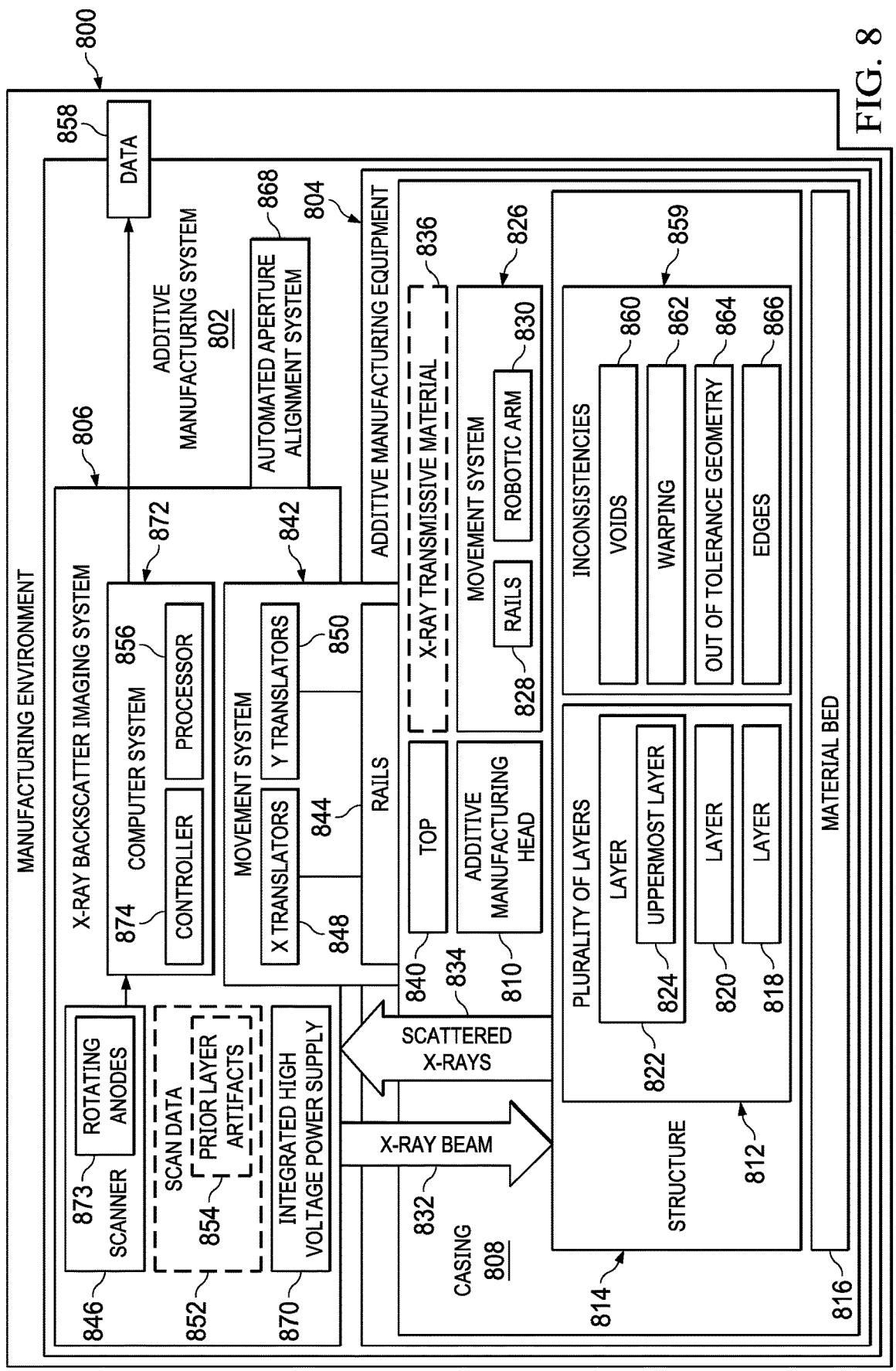
FIG. 8 is an illustration of a block diagram of a manufacturing environment in which an illustrative embodiment may be implemented.

Turning now to FIG. 8, an illustration of a block diagram of a manufacturing environment in which an illustrative embodiment may be implemented. Manufacturing environment 800 includes additive manufacturing system 802 configured to inspect structure 814 during manufacturing. Additive manufacturing system 100 of FIGS. 1-4 is a physical implementation of additive manufacturing system 802. Additive manufacturing system 500 of FIG. 5 is a physical implementation of additive manufacturing system 802. Additive manufacturing system 600 of FIG. 6 is a physical implementation of additive manufacturing system 802. Image 700 of FIG. 7 is an example of an image created using additive manufacturing system 802.

Additive manufacturing system 802 comprises additive manufacturing equipment 804 and x-ray backscatter imaging system 806. Additive manufacturing equipment 804 performs additive manufacturing using any desirable additive method. Some non-limiting additive manufacturing methods for additive manufacturing equipment 804 include: powder bed, powder feed, and wire feed additive manufacturing.

Additive manufacturing equipment 804 comprises casing 808 and additive manufacturing head 810 configured to form plurality of layers 812 of structure 814 within casing 808. In some illustrative examples, structure 814 is formed from material bed 816 by individually forming each layer of plurality of layers 812. As depicted, plurality of layers 812 includes layer 818, layer 820, and layer 822. As depicted, layer 822 is uppermost layer 824.

Additive manufacturing head 810 moves relative to material bed 816 using movement system 826. Movement system 826 takes any desirable form. In some illustrative examples, movement system 826 comprises rails 828. In some illustrative examples, movement system 826 comprises robotic arm 830.

X-ray backscatter imaging system 806 is configured to send x-ray beam 832 into structure 814 formed within additive manufacturing equipment 804 and detect scattered x-rays for imaging and analysis of structure 814 during fabrication. Scattered x-rays 834 are also referred to as backscatter.

X-ray backscatter imaging system 806 is positioned inside of casing 808 or outside of casing 808. When x-ray backscatter imaging system 806 is outside of casing 808, x-ray backscatter imaging system 806 is not exposed to debris, exhaust, or any other undesirable conditions of an additive manufacturing method.

In illustrative examples where x-ray backscatter imaging system 806 is outside of casing 808, casing 808 of additive manufacturing equipment 804 includes a portion formed of x-ray transmissive material 836. X-ray transmissive material 836 allows for x-ray beam 832 to enter casing 808 to encounter structure 814. In some illustrative examples, x-ray transmissive material 836 allows for entrance of x-ray beam 832 by the thickness of x-ray transmissive material 836. In some illustrative examples, x-ray transmissive material 836 allows for entrance of x-ray beam 832 by the regularity of material in x-ray transmissive material 836. In some illustrative examples, x-ray transmissive material 836 allows for entrance of x-ray beam 832 by the regularity of the surface in x-ray transmissive material 836. In some illustrative examples, x-ray transmissive material 836 takes the form of a metal. In some illustrative examples, x-ray transmissive material 836 is aluminum or titanium.

X-ray transmissive material 836 is present at any location of casing 808 where x-ray beam 832 may be sent into additive manufacturing equipment 804 to encounter structure 814. In some illustrative examples, x-ray transmissive material 836 is present in top 840 of casing 808.

X-ray backscatter imaging system 806 is positioned relative to any desired side of casing 808. In some illustrative examples, x-ray backscatter imaging system 806 is mounted on casing 808 of additive manufacturing equipment 804 such that x-ray beam 832 sent by x-ray backscatter imaging system 806 encounters the most recently formed layer of structure 814 first. In one illustrative example, uppermost layer 824 is the most recently formed layer of structure 814. In this illustrative example, x-ray backscatter imaging system 806 is positioned relative to top 840 of casing 808 to send x-ray beam 832 into uppermost layer 824 of structure 814 first. In this illustrative example, x-ray backscatter imaging system 806 is mounted on casing 808 of additive manufacturing equipment 804 such that x-ray beam 832 sent by x-ray backscatter imaging system 806 encounters the most recently formed layer of structure 814, layer 822, first.

In other illustrative examples, x-ray backscatter imaging system 806 is coupled to a side of casing 808. In these illustrative examples, x-ray backscatter imaging system 806 is coupled to the side of casing 808 such that x-ray backscatter imaging system 806 moves perpendicular to the nearest most layer, layer 822, of structure 814. In these illustrative examples, x-ray beam 832 is sent through the side of casing 808 and into structure 814. In these illustrative examples, x-ray beam 832 is sent through the side of casing 808 and encounters each of plurality of layers 812 from the side of structure 814. In these illustrative examples, the side of casing 808 of additive manufacturing equipment 804 includes a portion formed of x-ray transmissive material 836.

X-ray backscatter imaging system 806 comprises movement system 842 mounted on casing 808 of additive manufacturing equipment 804 and configured to move x-ray backscatter imaging system 806 relative to casing 808. As depicted, movement system 842 includes rails 844. Rails 844 are mounted on casing 808. Scanner 846 of x-ray backscatter imaging system 806 moves along rails 844 to inspect structure 814. In some illustrative examples, movement system 842 comprises X-translators 848 and Y-translators 850.

In some illustrative examples, scanner 846 is mounted on rails 844 that take the form of a linear two-rail stage directly above the additive process in additive manufacturing equipment 804. In these illustrative examples, a rotating collimator of scanner 846 scans downward between rails 844 onto uppermost layer 824 of structure 814. In some illustrative examples, uppermost layer 824 may be referred to as an additive surface that is being created. X-ray backscatter imaging system 806 is mounted outside of casing 808, which is a containment area where inert gas and high heat/energy would be present. X-ray backscatter imaging system 806 can "see" through walls. As long as casing 808 is x-ray transmissive material 836, it is essentially transparent to the x-ray backscatter imaging process. In some illustrative examples, x-ray transmissive material 836 is substantially transparent by being substantially uniform. If the energy of x-ray beam 832 is sufficient to penetrate casing 808, x-ray transmissive material 836 allows scattered x-rays 834 to come back through casing 808 to detectors of scanner 846. Detectors of scanner 846 collect scattered x-rays 834 and scattered x-rays 834 are registered to the current position via a positional sensor, such as a linear encoder.

When x-ray backscatter imaging system 806 is mounted outside of additive manufacturing equipment 804, scanner 846 could potentially be a temporary or permanent retrofit on additive manufacturing equipment, such as additive manufacturing equipment. For example, x-ray backscatter imaging system 806 may be a retrofit to additive manufacturing equipment manufacturing structures that require process development or validation, or manufacturing process control.

Scan data 852 is formed by backscatter, scattered x-rays 834, received by x-ray backscatter imaging system 806. Scan data 852 includes not only responses from uppermost layer 824, but also prior layer artifacts 854. Prior layer artifacts 854 are responses from prior layers of plurality of layers 812. Processor 856 is present in x-ray backscatter imaging system 806 to process scan data 852. Processor 856 is configured to isolate data 858 for a number of nearest most layers by removing prior layer artifacts 854 from scan data 852. Image subtraction of recent layers from deeper layers provides isolation of data 858. Prior layer artifacts 854 include not only non-physical indications created by the x-ray process, but also structure-related data such as features or inconsistencies in prior layers. Number of nearest most layers includes any desirable quantity of layers. In some illustrative examples, data 858 is for a single layer, uppermost layer 824. In some other illustrative examples, data 858 is for more than one layer. For example, data 858 may be for two layers or three layers. In some examples, data 858 is for more than three layers. In some illustrative examples, a quantity of layers in the number of nearest most layers in data 858 is selected based on at least one of a type of material, a thickness of the layers, or the location of the last x-ray backscattering inspection.

Scan data 852 formed from scattered x-rays 834 is going to be the most sensitive to recently applied layer or layers. X-ray backscatter imaging system 806 is capable of providing in-situ process monitoring of structure 814. The results can be tied to parameters of additive manufacturing equipment 804 and other any other sensor/inspection data being collected.

In other illustrative examples, scanner 846 of x-ray backscatter imaging system 806 is contained within casing 808 of additive manufacturing equipment 804. In some of these illustrative examples, scanner 846 of x-ray backscatter imaging system 806 is associated with a same movement system as additive manufacturing head 810, movement system 826. In some of these illustrative examples, scanner 846 of x-ray backscatter imaging system 806 only travels along rails 828 after additive manufacturing head 810 has completed laying down a layer.

In some other illustrative examples, scanner 846 can track directly behind additive manufacturing head 810 at a selected distance, and scan the entire width of structure 814 in a single pass. If structure 814 is a larger structure, a second pass could be done. For example, if structure 814 is wider than a scan width of scanner 846, a second pass could be done.

For single passes, scanner 846 can follow at a prescribed lag behind additive manufacturing head 810 to monitor quality of the layer being created, uppermost layer 824. Inconsistencies 859 in structure 814 that may be detected by x-ray backscatter imaging system 806 include voids 860, warping 862, out of tolerance geometry 864, and edges 866. Other inconsistencies that may be present in inconsistencies 859 are lack of fusion, roughness, or other macro inconsistencies.

In some illustrative examples, the scan position could be set to directly track and image the consolidation as it happens. Imaging the formation of a layer, such as layer 822, as it occurs is valuable especially during process development for a new part. X-ray backscatter using x-ray backscatter image system 806 of additive manufacturing (AM) by additive manufacturing equipment 804 can be used for process development of new parts.

X-ray backscatter of additive manufacturing (AM) can be used for in-situ process monitoring and feedback control of additive manufactured (AM) parts. X-ray backscatter may be used alone, or in concert with other sensor and non-destructive inspection tools.

Additive manufacturing head 810 and scan positions can be synced using encoders. When inconsistencies or variations are identified on-the-fly using machine learned defect recognition, repair, reapplication, or consolidation activities can be done before the next layer is created. The actions taken based on identified inconsistencies could be guided by an operator, or automatically chosen based on backscatter image analysis and predetermined actions.

If data 858 is found to be out of tolerance, a system is notified. In some illustrative examples, a FEA model is automatically run to predict the effect of the inconsistencies on performance. In some illustrative examples, either approval or repair of uppermost layer 824 is set by the FEA model before continuing. Repair may be the local addition of material or stripping of a number of layers, and re-applying, while taking note of process parameter changes. In some other illustrative examples, an operator stops the process, assesses inconsistencies 859 and makes a determination for a repair or for use-as is (MRB). In some illustrative examples, a combination of a FEA model and manual review of an operation is performed.

X-ray backscatter imaging system 806 has several features configured to enable a sufficiently small and efficient system for positioning x-ray backscatter imaging system 806 on additive manufacturing equipment 804. In some illustrative examples, additive manufacturing system 802 includes automated aperture alignment system 868 for aligning apertures in x-ray backscatter imaging system 806. As depicted, x-ray backscatter imaging system 806 further comprises integrated high voltage power supply 870. In some illustrative examples, x-ray backscatter imaging system 806 comprises rotating anodes 873.

As depicted, processor 856 is part of computer system 872. As depicted, computer system 872 also has controller 874 configured to control movement and operation of x-ray backscatter imaging system 806.

The illustration of manufacturing environment 800 and the different components in this environment are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment. For example, in some non-depicted examples, controller 874 and processor 856 are part of different computer systems.

As another example, controller 874 runs a program to form structure 814. The program, although not depicted, provides commands to form structure 814. Other programs are used to form structures having a different design than structure 814. In some illustrative examples, the program, not depicted, is updated in response to identifying out of tolerance inconsistencies 859. In some illustrative examples, by updating the program, inconsistencies are reduced in at least one of severity or quantity in a second structure having a same design as structure 814 and created using additive manufacturing equipment 804. In one example, if inconsistencies 859 include edges 866 out of tolerance, the program used to form structure 814 is updated to modify deposition near the edges.

As yet another example, additive manufacturing system 802 has settings, such as power settings, speed settings, or other settings for utilizing additive manufacturing equipment 804 to form structures. In some illustrative examples, the settings, not depicted, are updated in response to identifying out of tolerance inconsistencies 859. In some illustrative examples, by updating the settings, inconsistencies are reduced in at least one of severity or quantity in a second structure having a same design as structure 814 and created using additive manufacturing equipment 804. In some examples, if warping 862 is out of tolerance or out of tolerance geometry 864 is present, the speed settings of additive manufacturing equipment 804 are changed to modify the deposition of the geometry.

Figure 9:
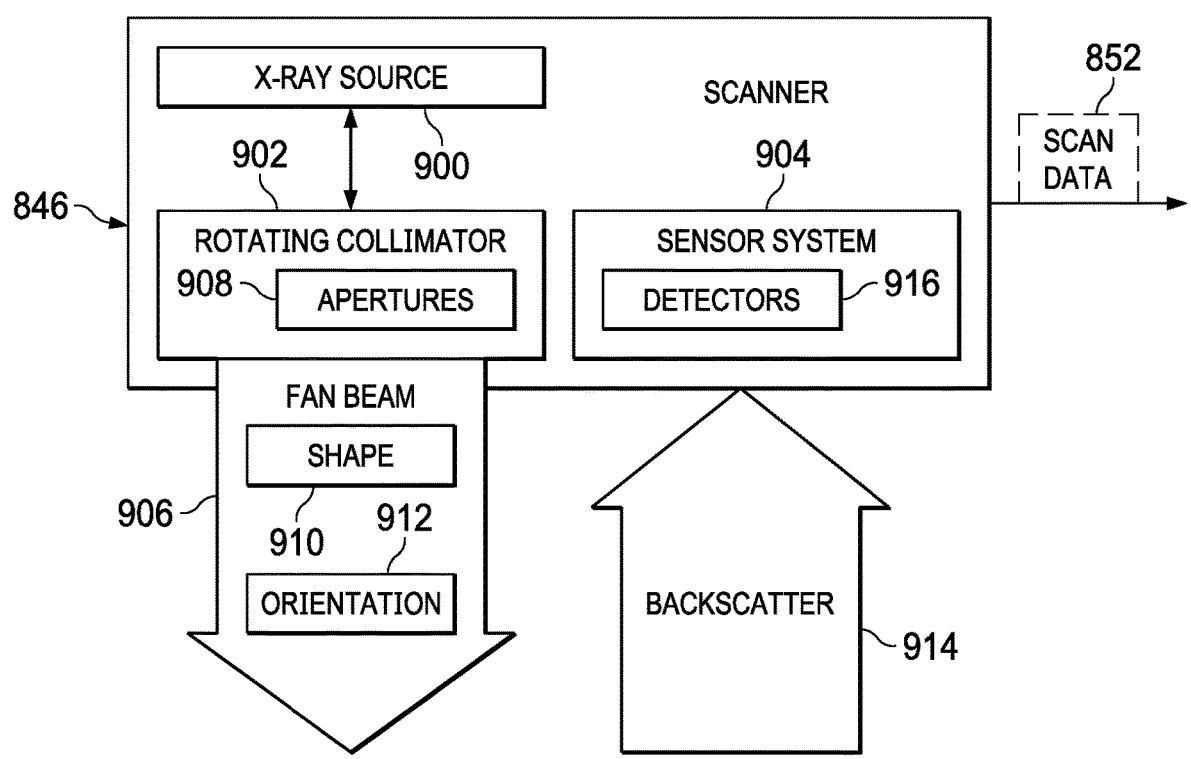
FIG. 9 is an illustration of a block diagram of a scanner in accordance with an illustrative embodiment.

With reference now to FIG. 9, an illustration of a block diagram of a scanner is depicted in accordance with an illustrative embodiment. As depicted, the components in this figure illustrate one example of an implementation for scanner 846 shown in block form in FIG. 8. In this illustrative example, scanner 846 comprises x-ray source 900, rotating collimator 902, and sensor system 904. Thus, x-ray backscatter imaging system 806 comprises x-ray source 900, rotating collimator 902, and number of x-ray detectors 916.

X-ray source 900 is a source of x-rays that are emitted from scanner 846 as fan beam 906 in this illustrative example. Fan beam 906 is an example of an implementation for x-ray beam 832 shown in block form in FIG. 8. The ionized energy level of x-ray source 900 as well as material scattered properties of structure 814 determines total inspected layers of plurality of layers 812.

X-ray source 900 may be an x-ray tube. In this illustrative example, scanner 846 can be implemented as a self-contained unit. For example, x-ray source 900 can include a power source needed to provide power to generate fan beam 906.

In the illustrative example, collimator 902 is a device that narrows a beam of particles or waves to form fan beam 906. For example, apertures 908 are present in collimator 902 that defines shape 910 of fan beam 906. Apertures 908 have a rectangular shape, in this example, that causes shape 910 of fan beam 906 to be rectangular. Further, fan beam 906 has orientation 912.

As depicted, sensor system 904 detects backscatter 914 that results from an x-ray beam, such as fan beam 906, encountering structure 814 shown in block form in FIG. 8. Backscatter 914 may also be referred to as scattered x-rays, such as scattered x-rays 834 of FIG. 8. In this illustrative example, sensor system 904 generates scan data 852 and sends scan data 852 to computer system 872 shown in block form in FIG. 8.

In this illustrative example, sensor system 904 is comprised of number of x-ray detectors 916. As depicted, number of x-ray detectors 916 can be implemented using solid-state detectors. These detectors may be arranged in an array as pixels. The solid-state detectors may be, for example, semiconductor detectors that convert x-ray photons to an electrical charge that forms scan data 852. This data is in a form that allows for generating a digital image.

The illustration of manufacturing environment 800 and the different components in this environment in FIGS. 8-9 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 10:
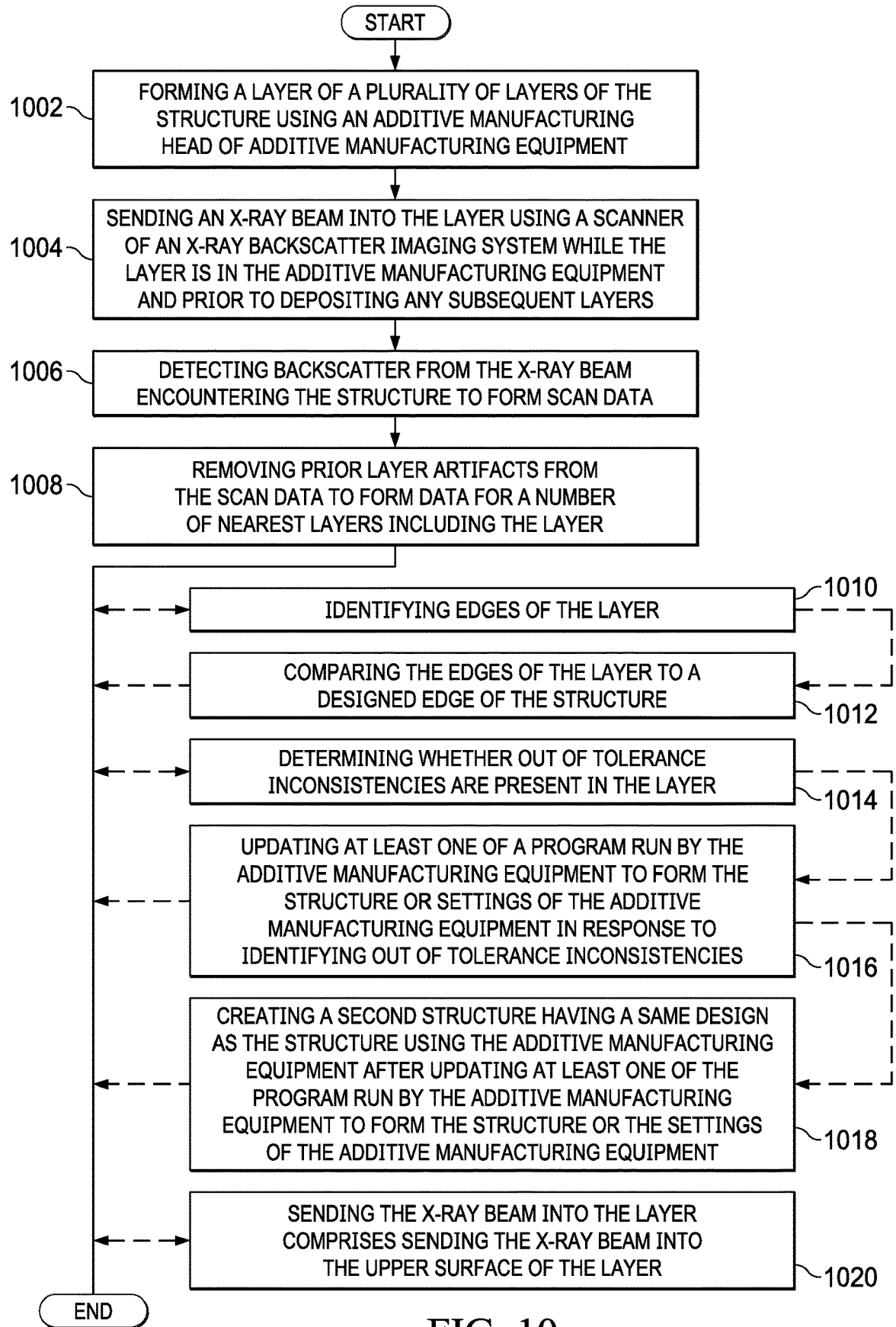
FIG. 10 is an illustration of a flowchart of a method for inspecting a structure during additive manufacturing of the structure in accordance with an illustrative embodiment.

Turning now to FIG. 10, an illustration of a flowchart of a method for inspecting a structure during additive manufacturing of the structure is depicted in accordance with an illustrative embodiment. Method 1000 may be performed using additive manufacturing system 100 of FIGS. 1-4. Method 1000 may be performed using additive manufacturing system 500 of FIG. 5. Method 1000 may be performed using additive manufacturing system 600 of FIG. 6. Method 1000 may form image 700 of FIG. 7. Method 1000 may be performed using additive manufacturing system 802 of FIG. 8.

Method 1000 forms a layer of a plurality of layers of the structure using an additive manufacturing head of additive manufacturing equipment (operation 1002). Method 1000 sends an x-ray beam into the layer using a scanner of an x-ray backscatter imaging system while the layer is in the additive manufacturing equipment and prior to depositing any subsequent layers (operation 1004). Method 1000 detects backscatter from the x-ray beam encountering the structure to form scan data (operation 1006). Method 1000 removes prior layer artifacts from the scan data to form data for a number of nearest layers including the layer (operation 1008).

In some illustrative examples, method 1000 identifies edges of the layer (operation 1010), and compares the edges of the layer to a designed edge of the structure (operation 1012).

In some illustrative examples, method 1000 determines whether out of tolerance inconsistences are present in the layer (operation 1014). In some illustrative examples, inconsistencies include at least one of voids, out of tolerance edges, or geometric warping.

In some illustrative examples, method 1000 updates at least one of a program run by the additive manufacturing equipment to form the structure or settings of the additive manufacturing equipment in response to identifying out of tolerance inconsistencies (operation 1016). In some illustrative examples, method 1000 creates a second structure having a same design as the structure using the additive manufacturing equipment after updating at least one of the program run by the additive manufacturing equipment to form the structure or the settings of the additive manufacturing equipment (operation 1018).

In some illustrative examples, sending the x-ray beam into the layer comprises sending the x-ray beam into an upper surface of the layer (operation 1020). In these illustrative examples, the x-ray backscatter imaging system sending the x-ray beam is positioned on a top surface of a casing.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram. Some blocks may be optional. For example, operation 1010 through operation 1020 of FIG. 10 may be optional.

Figure 11:
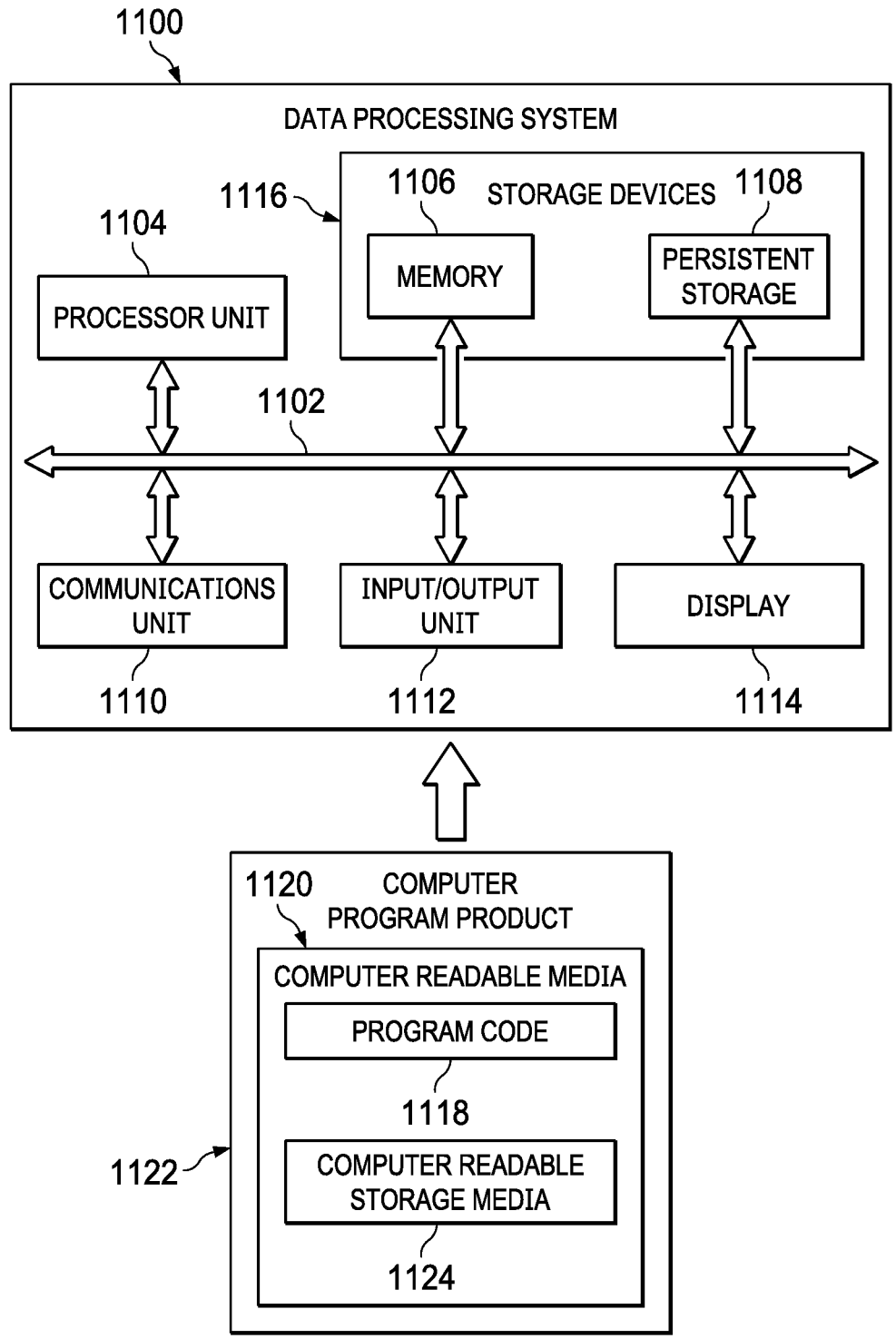
FIG. 11 is an illustration of a block diagram of a data processing system in accordance with an illustrative embodiment.

Turning now to FIG. 11, an illustration of a block diagram of a data processing system is depicted in accordance with an illustrative embodiment. Data processing system 1100 may be used to implement computer system 872 shown in block form in FIG. 8. In this illustrative example, data processing system 1100 includes communications framework 1102 (e.g. communications fabric), which provides communications between processor unit 1104, memory 1106, persistent storage 1108, communications unit 1110, input/output unit 1112, and display 1114. In this example, communications framework 1102 may take the form of a bus system.

Processor unit 1104 serves to execute instructions for software that may be loaded into memory 1106. Processor unit 1104 may be a number of processors, a multi-processor core, or some other type of processor, depending on the particular implementation.

Memory 1106 and persistent storage 1108 are examples of storage devices 1116. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1116 may also be referred to as computer-readable storage devices in these illustrative examples. Memory 1106, in these examples, may be, for example, a random-access memory or any other suitable volatile or non-volatile storage device. Persistent storage 1108 may take various forms, depending on the particular implementation.

For example, persistent storage 1108 may contain one or more components or devices. For example, persistent storage 1108 may be a hard drive, a solid-state drive (SSD), a flash memory, a rewritable optical disk, a rewritable magnetic tape, or some combination of the above. The media used by persistent storage 1108 also may be removable. For example, a removable hard drive may be used for persistent storage 1108.

Communications unit 1110, in these illustrative examples, provides for communications with other data processing systems or devices. In these illustrative examples, communications unit 1110 is a network interface card.

Input/output unit 1112 allows for input and output of data with other devices that may be connected to data processing system 1100. For example, input/output unit 1112 may provide a connection for user input through at least one of a keyboard, a mouse, or some other suitable input device. Further, input/output unit 1112 may send output to a printer. Display 1114 provides a mechanism to display information to a user.

Instructions for at least one of the operating system, applications, or programs may be located in storage devices 1116, which are in communication with processor unit 1104 through communications framework 1102. The processes of the different embodiments may be performed by processor unit 1104 using computer-implemented instructions, which may be located in a memory, such as memory 1106.

These instructions are referred to as program code, computer usable program code, or computer-readable program code that may be read and executed by a processor in processor unit 1104. The program code in the different embodiments may be embodied on different physical or computer-readable storage media, such as memory 1106 or persistent storage 1108.

Program code 1118 is located in a functional form on computer-readable media 1120 that is selectively removable and may be loaded onto or transferred to data processing system 1100 for execution by processor unit 1104. Program code 1118 and computer-readable media 1120 form computer program product 1122 in these illustrative examples. In the illustrative example, computer-readable media 1120 is computer-readable storage media 1124.

In these illustrative examples, computer-readable storage media 1124 is a physical or tangible storage device used to store program code 1118 rather than a medium that propagates or transmits program code 1118.

Alternatively, program code 1118 may be transferred to data processing system 1100 using a computer-readable signal media. The computer-readable signal media may be, for example, a propagated data signal containing program code 1118. For example, the computer-readable signal media may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1100 are not meant to provide architectural limitations to the manner in which different embodiments may be implemented. The different illustrative embodiments may be implemented in a data processing system including components in addition to or in place of those illustrated for data processing system 1100. Other components shown in FIG. 11 can be varied from the illustrative examples shown. The different embodiments may be implemented using any hardware device or system capable of running program code 1118.

Thus, the illustrative examples provide a method, an apparatus, and a system for in-situ real-time inspection of an additive manufactured structure using backscatter x-ray methods for the detection of out of tolerance manufacturing inconsistencies. During operation, an x-ray backscatter imaging system translates, or is positioned using an automated method to scan a structure in additive manufacturing equipment. In some illustrative examples, the x-ray backscatter imaging system translates, or is positioned along a path of an additive manufacturing head.

The scanning process occurs following printing of an additive path or at the completion of a printed sectional layer. The x-ray backscatter imaging system is comprised of an x-ray source and a rotating beam collimator mounted to the additive printing head, mechanism, or positional gantry.

The ionized energy level of the x-ray source and material scattered properties determines total inspected layers. In some illustrative examples, the x-ray scatter power intensity for subsequent inspection of newly added material layers will vary in relation to detected voids, density variations, or other inconsistencies or as compared to prior manufacturing data. In some illustrative examples, inspection frequency is based on level or percentage of out of tolerance items. In some illustrative examples, a FEA analysis is automatically run to predict an effect of a detected inconsistency.

The illustrative examples provide a method of in-situ NDE utilizing x-ray backscatter. An additive manufacturing system has a scanning bridge with rotating x-ray collimator that can be rapidly scanned over a recently added set of layers. The energy level of the source and the material scatter properties will determine how many layers can be inspected at once.

An area scan of x-ray backscatter will have better spatial resolution of inconsistencies than IR Thermography, and as-good or better depth penetration as ultrasound. In some illustrative examples, after a pre-determined set of layers are created, the additive process is briefly stopped while the backscatter scanner images that set of layers to ensure their quality. The x-ray scatter intensity of the nearest most layers will vary spatially based upon lack of consolidation, voids, density variations, etc. that can be created during additive manufacturing (AM) processes.

Two-dimensional backscatter images of nearest most layers are created and are analyzed for out-of-tolerance inconsistencies (acceptable inconsistencies size and intensity loss) or automatically compared against the data from a set of identical layers from a reference part or digital data set representing the part. If in-tolerance (acceptable) layer sets are found, the additive manufacturing (AM) process continues for the next set of layers. If out-of-tolerance backscatter data is found in the present layer set, the system is notified and either a FEA model of the defect layers is automatically run to predict the effect of the inconsistencies on performance and a buy-off or repair of the layer set before continuing, or an operator stops the process, assesses the inconsistencies and makes a determination for a repair or use-as is (MRB), or some combination thereof. Repair may be the local addition of material or stripping of the required layer(s), and re-applying, while taking note of as-needed process parameter changes.

After a next set of layers are added, the additive manufacturing process is briefly stopped and the x-ray backscatter scan of those layers is completed. The set of layers includes any desirable quantity of layers. These inspection steps may be repeated until the additive manufactured (AM) structure is completed.

Benefits of the additive manufacturing system and methods include in-Situ macroscopic and geometric measurements. X-ray backscatter inspection of an additive manufactured (AM) structure can support rapid process development.

X-ray backscatter inspection of an additive manufactured (AM) structure can provide tailoring, dialing in of the additive manufacturing process. X-ray backscatter inspection of an additive manufactured (AM) structure can provide faster results than waiting until the structure is complete and sending it out for CT or x-ray inspection.

X-ray backscatter inspection of an additive manufactured (AM) structure can provide a shorter feedback loop. X-ray backscatter inspection of an additive manufactured (AM) structure can provide a process monitoring tool In a powder bed manufacturing technique, x-ray backscatter inspection can provide real-time feedback of a build. Inspecting in-situ allows for determining if scrap or repair is advised during manufacturing of the structure. By determining if scrap or repair is advised in situ, additional time, money, or material is not directed towards a structure that could be scrapped or repaired.

In a powder bed manufacturing technique, media is buried under powder, but the x-ray backscatter sees through the powder to perform the inspection. X-ray backscatter allows for inspection of shape or geometrical distortions. X-ray backscatter allows for rapid set up for process development.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An additive manufacturing system comprising:
    additive manufacturing equipment comprising a casing and an additive manufacturing head configured to form a plurality of layers of a structure within the casing;
    an x-ray backscatter imaging system configured to send an x-ray beam into the structure formed within the additive manufacturing equipment and detect scattered x-rays for imaging and analysis of the structure during fabrication; and
    a processor configured to remove prior layer artifacts from scan data.

2. The additive manufacturing system of claim 1, wherein the casing of the additive manufacturing equipment includes a portion formed of an x-ray transmissive material, and wherein the x-ray backscatter imaging system is positioned outside of the casing.

3. The additive manufacturing system of claim 2, wherein the x-ray backscatter imaging system comprises a movement system mounted on the casing of the additive manufacturing equipment and configured to move the x-ray backscatter imaging system relative to the casing.

4. The additive manufacturing system of claim 3, wherein the movement system comprises X-translators and Y-translators.

5. The additive manufacturing system of claim 3, wherein the x-ray backscatter imaging system is mounted on the casing of the additive manufacturing equipment such that the x-ray beam sent by the x-ray backscatter imaging system encounters the most recently formed layer of the structure first.

6. The additive manufacturing system of claim 1, wherein the x-ray backscatter imaging system comprises an x-ray source, a rotating collimator, and a number of x-ray detectors.

7. An additive manufacturing system comprising:
    additive manufacturing equipment comprising a casing and an additive manufacturing head configured to form a plurality of layers of a structure within the casing;
    an x-ray backscatter imaging system configured to send an x-ray beam into the structure formed within the additive manufacturing equipment and detect scattered x-rays for imaging and analysis of the structure during fabrication; and
    a processor configured to isolate data for a number of nearest most layers by removing prior layer artifacts from scan data.

8. The additive manufacturing system of claim 1, wherein a scanner of the x-ray backscatter imaging system is contained within the casing of the additive manufacturing equipment.

9. The additive manufacturing system of claim 8, wherein the scanner of the x-ray backscatter imaging system is associated with a same movement system as the additive manufacturing head.

10. An additive manufacturing system comprising:
    additive manufacturing equipment; and
    an x-ray backscatter imaging system configured to inspect a structure formed within the additive manufacturing equipment, the x-ray backscatter imaging system comprising an x-ray source, a rotating collimator, and a number of x-ray detectors; and
    a processor configured to isolate data for a number of nearest most layers by removing prior layer artifacts from scan data generated by the x-ray backscatter imaging system.

11. The additive manufacturing system of claim 10 further comprising:
    an automated aperture alignment system for aligning apertures in the x-ray backscatter imaging system.

12. The additive manufacturing system of claim 10 wherein the x-ray backscatter imaging system further comprises an integrated high voltage power supply.

13. The additive manufacturing system of claim 10 wherein the x-ray backscatter imaging system comprises rotating anodes.

14. The additive manufacturing system of claim 10, wherein a casing of the additive manufacturing equipment includes a portion formed of an x-ray transmissive material, and wherein the x-ray backscatter imaging system is positioned outside of the casing.

15. A method of inspecting a structure during additive manufacturing of the structure, the method comprising:
    forming a layer of a plurality of layers of the structure using an additive manufacturing head of additive manufacturing equipment;
    sending an x-ray beam into the layer using a scanner of an x-ray backscatter imaging system while the layer is in the additive manufacturing equipment and prior to depositing any subsequent layers;
    detecting backscatter from the x-ray beam encountering the structure to form scan data; and
    removing prior layer artifacts from the scan data to form data for a number of nearest layers including the layer.

16. The method of claim 15 further comprising:
    identifying edges of the layer; and
    comparing the edges of the layer to a designed edge of the structure.

17. The method of claim 15 further comprising:
    determining whether out of tolerance inconsistences are present in the layer.

18. The method of claim 17, wherein inconsistencies include at least one of voids, out of tolerance edges, or geometric warping.

19. The method of claim 17 further comprising:
    updating at least one of a program run by the additive manufacturing equipment to form the structure or settings of the additive manufacturing equipment in response to identifying out of tolerance inconsistencies; and
    creating a second structure having a same design as the structure using the additive manufacturing equipment after updating at least one of the program run by the additive manufacturing equipment to form the structure or the settings of the additive manufacturing equipment.

20. The method of claim 15, wherein sending the x-ray beam into the layer comprises sending the x-ray beam into an upper surface of the layer.

* * * * *